United States Patent
Chuang

(10) Patent No.: US 11,079,047 B2
(45) Date of Patent: Aug. 3, 2021

(54) PRESTA VALVE CONNECTOR

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 0 days.

(21) Appl. No.: 16/923,257

(22) Filed: Jul. 8, 2020

(65) Prior Publication Data

US 2021/0140571 A1    May 13, 2021

(30) Foreign Application Priority Data

Nov. 8, 2019 (TW) .................. 108140649

(51) Int. Cl.
*F16L 29/02* (2006.01)
*F16K 15/20* (2006.01)

(52) U.S. Cl.
CPC .............. *F16L 29/02* (2013.01); *F16K 15/20* (2013.01); *Y10T 137/3724* (2015.04)

(58) Field of Classification Search
CPC ..... F16L 29/02; F16K 15/20; Y10T 137/3724
See application file for complete search history.

(56) References Cited

U.S. PATENT DOCUMENTS

| | | | |
|---|---|---|---|
| 5,921,269 A * | 7/1999 | Wu | B60S 5/04 137/223 |
| 8,402,987 B2 | 3/2013 | Wang | |
| 8,720,475 B2 * | 5/2014 | Wu | F04B 33/00 137/231 |
| 8,960,214 B2 * | 2/2015 | Kozuschek | F16K 15/20 137/15.08 |
| 9,249,914 B2 | 2/2016 | Kuo | |
| 10,203,059 B2 | 2/2019 | Chuang | |

FOREIGN PATENT DOCUMENTS

| | | |
|---|---|---|
| TW | 201416553 A | 5/2014 |
| TW | M507854 U | 9/2015 |
| TW | 201800688 A | 1/2018 |

* cited by examiner

*Primary Examiner* — Kevin L Lee
(74) *Attorney, Agent, or Firm* — Karin L. Williams; Alan D. Kamrath; Mayer & Williams PC

(57) ABSTRACT

A Presta valve connector includes a housing and a stripping assembly rotatably connected to the housing. The housing is provided with a channel and an airtight ring having a connection hole. The airtight ring and the stripping assembly are disposed at two opposite ends of the channel. One end of the stripping assembly is disposed in the channel, and another end of the stripping assembly is exposed out of the channel. One end of the stripping assembly is provided with a driving groove faced to the connection hole. The driving groove is provided with a first driving face formed as a plane.

8 Claims, 7 Drawing Sheets

PRESTA VALVE CONNECTOR

BACKGROUND OF THE INVENTION

The present invention relates to a valve connector and, more particularly, to a Presta valve special connector.

Taiwan Utility Model No. M507854 discloses an improved valve comprising a valve stem and a core assembly including a core tube and a core bar airtightly locked in the core tube. The core tube is airtightly and threadedly connected in the valve stem, so that the tire valve can be installed on the wheel.

The Presta valve is composed of the above-mentioned parts, and the advantage of the Presta valve is that it can be applied to narrower tires due to the small diameter of the valve stem. When inflating, the operator must first loosen a captive nut on the top of the core assembly to permit airflow from the pump to pass through the core assembly and enter the tire. Because the diameter of the valve stem is small, and the space inside the core assembly is more narrowness to cause the Presta valve to have problems of low airflow and slow inflating speed.

Thus, a need exists for a novel Presta valve connector that mitigates and/or obviates the above drawbacks.

BRIEF SUMMARY OF THE INVENTION

An objective of the present invention is to provide a Presta valve special connector.

A Presta valve special connector according to the present invention comprises a housing, and a stripping assembly rotatably connected to the housing about a rotation axis and movable in relative to the housing in the rotation axis. The housing is provided with a channel. One end of the channel communicates with the outside of the housing and is provided with an airtight ring having a connection hole. The airtight ring and the stripping assembly are respectively disposed at two opposite ends of the channel. The stripping assembly defines a first end and a second end along the rotation axis. The first end of the stripping assembly is disposed in the channel, and the second end of the stripping assembly is exposed out of the channel. The first end of the stripping assembly is provided with a driving groove recessed in the rotation axis and faced to the connection hole. The driving groove is provided with a first driving face formed as a plane parallel to the rotation axis.

In an example, the driving groove is provided with a second driving face formed as a plane parallel to the first driving face.

In an example, the stripping assembly includes a driving rod and a switch member. A proximal end of the driving rod is disposed in the channel, and a distal end of the driving rod is exposed out of the channel. The driving groove is disposed at the proximal end of the driving rod. The switch member is rigidly connected to the distal end of the driving rod and is exposed out of the out of the channel.

In an example, an inner periphery of the channel is provided with a first section and a second section disposed at one side of the first section opposite to the airtight ring. A diameter of the second section in a radial direction of the channel is less than a diameter of the first section in the radial direction of the channel. The driving rod includes a head portion disposed in the first section and a body portion connected to the head portion. A diameter of the head portion in a radial direction of the rotation axis is greater than the diameter of the second section in the radial direction of the channel. One end of the body portion is connected to the head portion, and another end of the body portion opposite to the head portion extends through the second section and is exposed out of the channel. The switch member is rigidly connected to the body portion.

In an example, the inner periphery of the channel is provided with a third section disposed between the first and second sections. A diameter of the third section in the radial direction of the channel is less than the diameter of the first section in the radial direction of the channel and is greater than the diameter of the second section in the radial direction of the channel. A seal ring and a stopper are located in the channel. The seal ring is disposed in the third section. The stopper is disposed in the first section and abuts against a side of the seal ring opposite to the second section. The seal ring and the stopper are mounted around the body portion.

In an example, the body portion is provided with a first insert hole in the radial direction of the rotation axis. The switch member is provided with a second insert hole in the radial direction of the rotation axis. The stripping assembly includes a connection member mounted through the first and second insert holes.

In an example, the housing is provided with an end cap disposed at one end of the channel and abutting against the airtight ring.

In an example, the housing is provided with an inlet passage communicating between two ends of the channel. A positioning member, a pressure relief valve, and an elastic member are arranged in the inlet passage. The positioning member is disposed at one side of the inlet passage in a radial direction of the inlet passage. One end of the pressure relief valve is disposed at another side of the inlet passage opposite to the positioning member in the radial direction of the inlet passage. Another end of the pressure relief valve opposite to the positioning member is exposed out of the inlet passage. One end of the elastic member abuts against the positioning member, and another end of the elastic member abuts against the pressure relief valve.

The present invention will become clearer in light of the following detailed description of illustrative embodiments of this invention described in connection with the drawings.

DETAILED DESCRIPTION OF THE INVENTION

Figure 1:
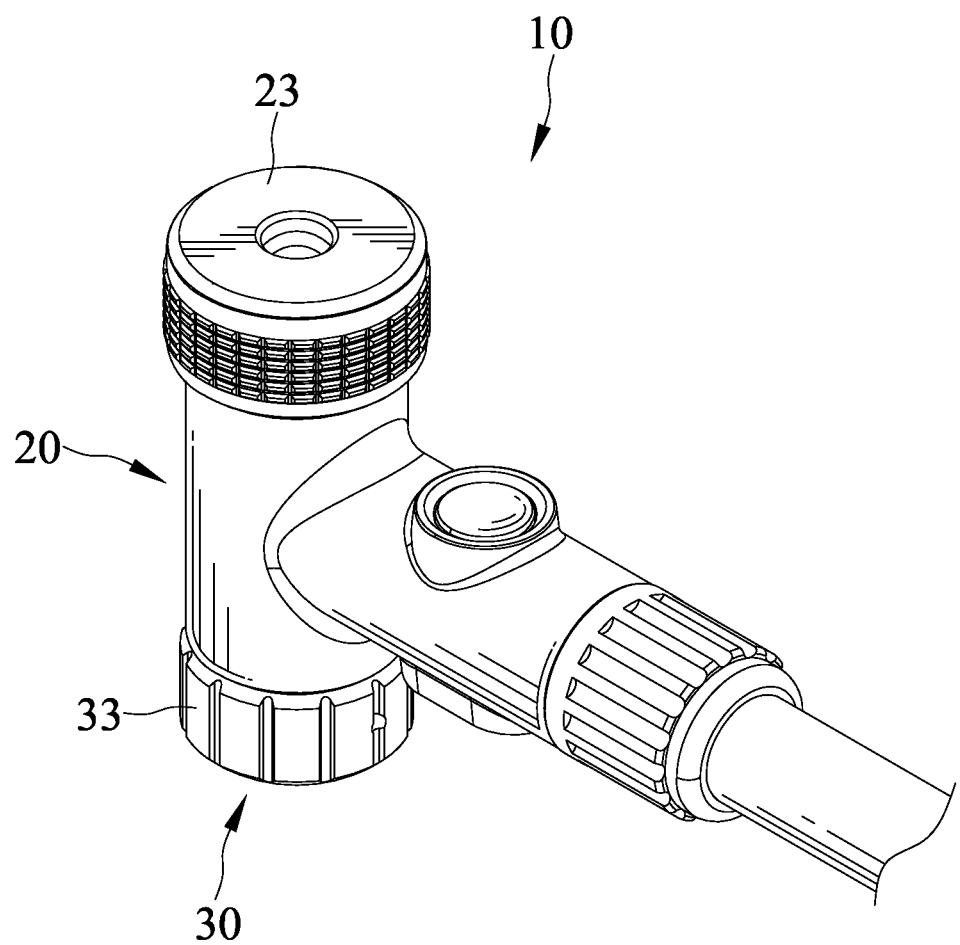
FIG. 1 is a perspective view of a Presta valve connector of an embodiment according to the present invention.
Figure 2:
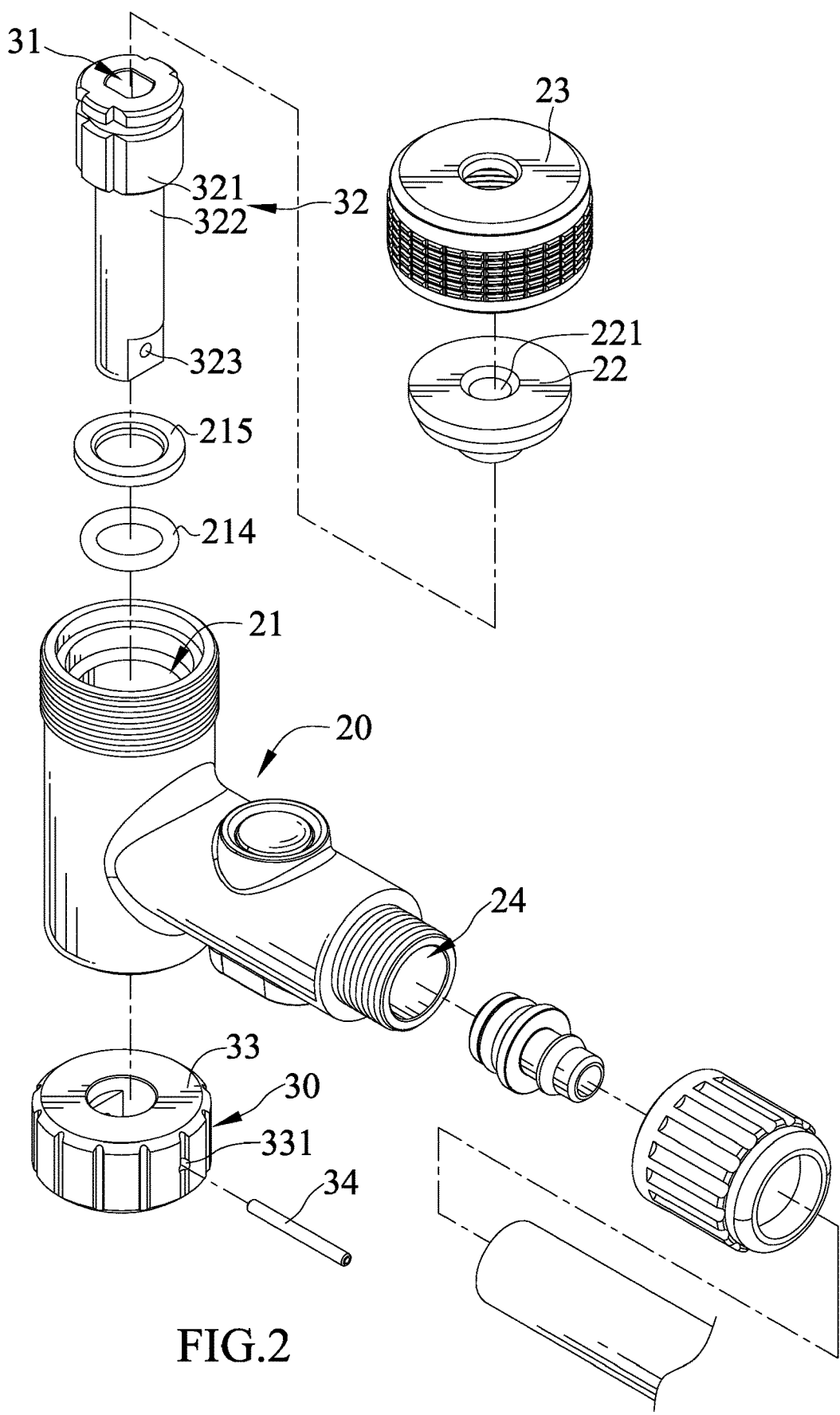
FIG. 2 is an exploded, perspective view of the Presta valve connector of FIG. 1.
Figure 3:
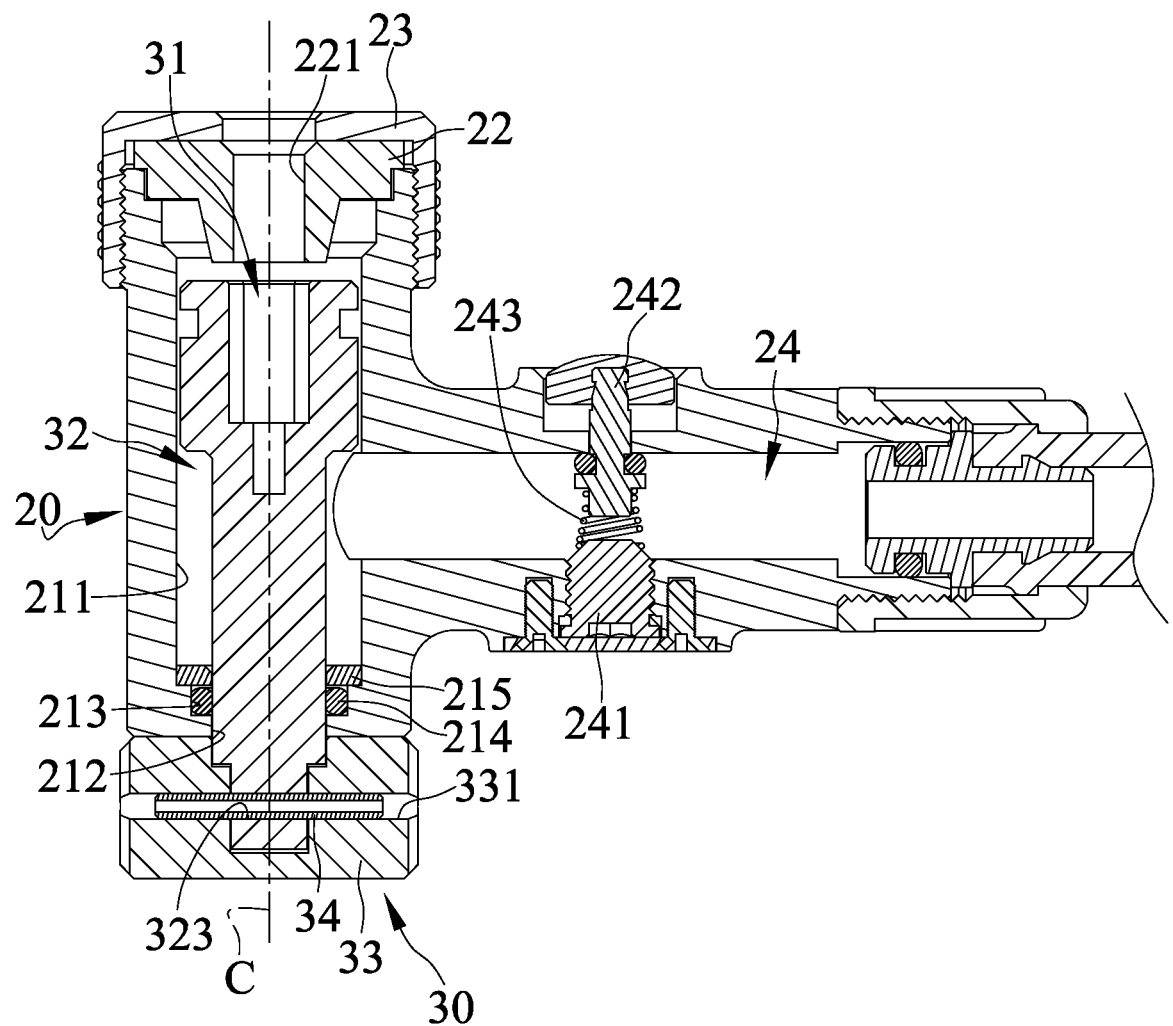
FIG. 3 is a cross sectional view of the Presta valve connector of FIG. 1
Figure 4:
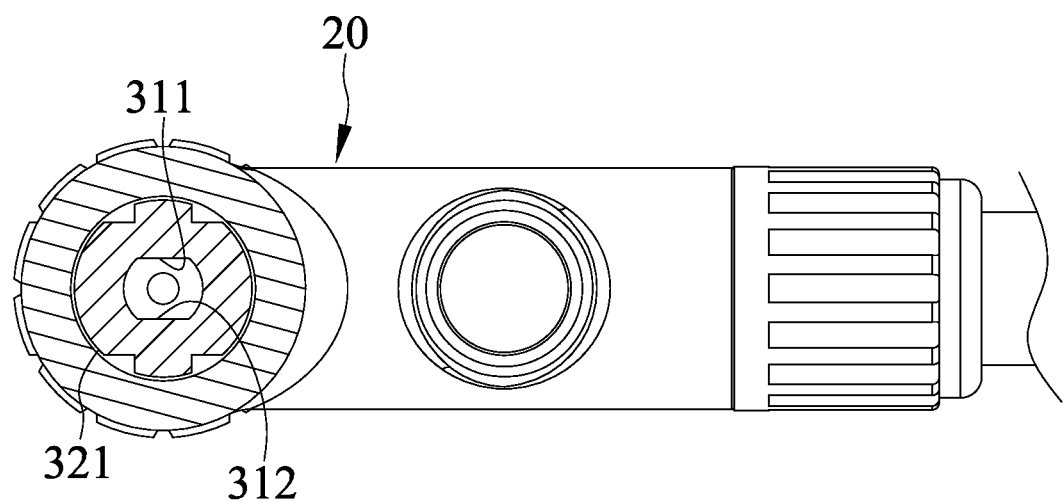
FIG. 4 is another cross sectional view of the Presta valve connector of FIG. 1.

With reference to FIGS. 1-4, a Presta valve connector 10 includes a housing 20 and a stripping assembly 30.

The housing 20 is provided with a channel 21. One end of the channel 21 communicates with the outside of the housing 20 and is provided with an airtight ring 22 having a connection hole 221. An inner periphery of the channel 21 is provided with a first section 211 and a second section 212 disposed at one side of the first section 211 opposite to the airtight ring 22. A diameter of the second section 212 in a radial direction of the channel 21 is less than a diameter of the first section 211 in the radial direction of the channel 21. The inner periphery of the channel 21 is further provided with a third section 213 disposed between the first and second sections 211 and 212. A diameter of the third section 213 in the radial direction of the channel 21 is less than the diameter of the first section 211 in the radial direction of the channel 21, and is greater than the diameter of the second section 212 in the radial direction of the channel 21.

A seal ring 214 and a stopper 215 are located in the channel 21. The seal ring 214 may be formed as an O-ring and is disposed in the third section 213. The stopper 215 is disposed in the first section 211 and abuts against a side of the seal ring 214 opposite to the second section 212.

The housing 20 is further provided with an end cap 23 disposed at one end of the channel 21 and abutting against the airtight ring 22.

The housing 20 is further provided with an inlet passage 24 communicating between two ends of the channel 21. A positioning member 241, a pressure relief valve 242, and an elastic member 243 are arranged in the inlet passage 24. The positioning member 241 is disposed at one side of the inlet passage 24 in a radial direction of the inlet passage 24. One end of the pressure relief valve 242 is disposed at another side of the inlet passage 24 opposite to the positioning member 241 in the radial direction of the inlet passage 24, and another end of the pressure relief valve 242 opposite to the positioning member 241 is exposed out of the inlet passage 24. One end of the elastic member 243 abuts against the positioning member 241, and another end of the elastic member 243 abuts against the pressure relief valve 242.

The stripping assembly 30 is rotatably connected to the housing 20 about a rotation axis C and is movable in relative to the housing 20 in the rotation axis C. The airtight ring 22 and the stripping assembly 30 are respectively disposed at two opposite ends of the channel 21. The stripping assembly 30 defines a first end and a second end along the rotation axis C. The first end of the stripping assembly 30 is disposed in the channel 21, and the second end of the stripping assembly 30 is exposed out of the channel 21.

The first end of the stripping assembly 30 is provided with a driving groove 31 recessed in the rotation axis C and faced to the connection hole 221. The driving groove 31 is provided with a first driving face 311 formed as a plane parallel to the rotation axis C. The driving groove 31 is further provided with a second driving face 312 formed as a plane parallel to the first driving face 311.

The stripping assembly 30 includes a driving rod 32 and a switch member 33. A proximal end of the driving rod 32 is disposed in the channel 21, and a distal end of the driving rod 32 is exposed out of the channel 21. The driving groove 31 is disposed at the proximal end of the driving rod 32. The switch member 33 is rigidly connected to the distal end of the driving rod 32 and is exposed out of the out of the channel 21.

The driving rod 32 includes a head portion 321 disposed in the first section 211 and a body portion 322 connected to the head portion 321. A diameter of the head portion 321 in a radial direction of the rotation axis C is greater than the diameter of the second section 212 in the radial direction of the channel 21. One end of the body portion 322 is connected to the head portion 321, and another end of the body portion 322 opposite to the head portion 321 extends through the second section 212 and is exposed out of the channel 21. The seal ring 214 and the stopper 215 are mounted around the body portion 322. The switch member 33 may be rigidly connected to the body portion 322.

The body portion 322 is provided with a first insert hole 323 in the radial direction of the rotation axis C. The switch member 33 is provided with a second insert hole 331 in the radial direction of the rotation axis C. The stripping assembly 30 further includes a connection member 34 mounted through the first and second insert holes 323 and 331.

Figure 5:
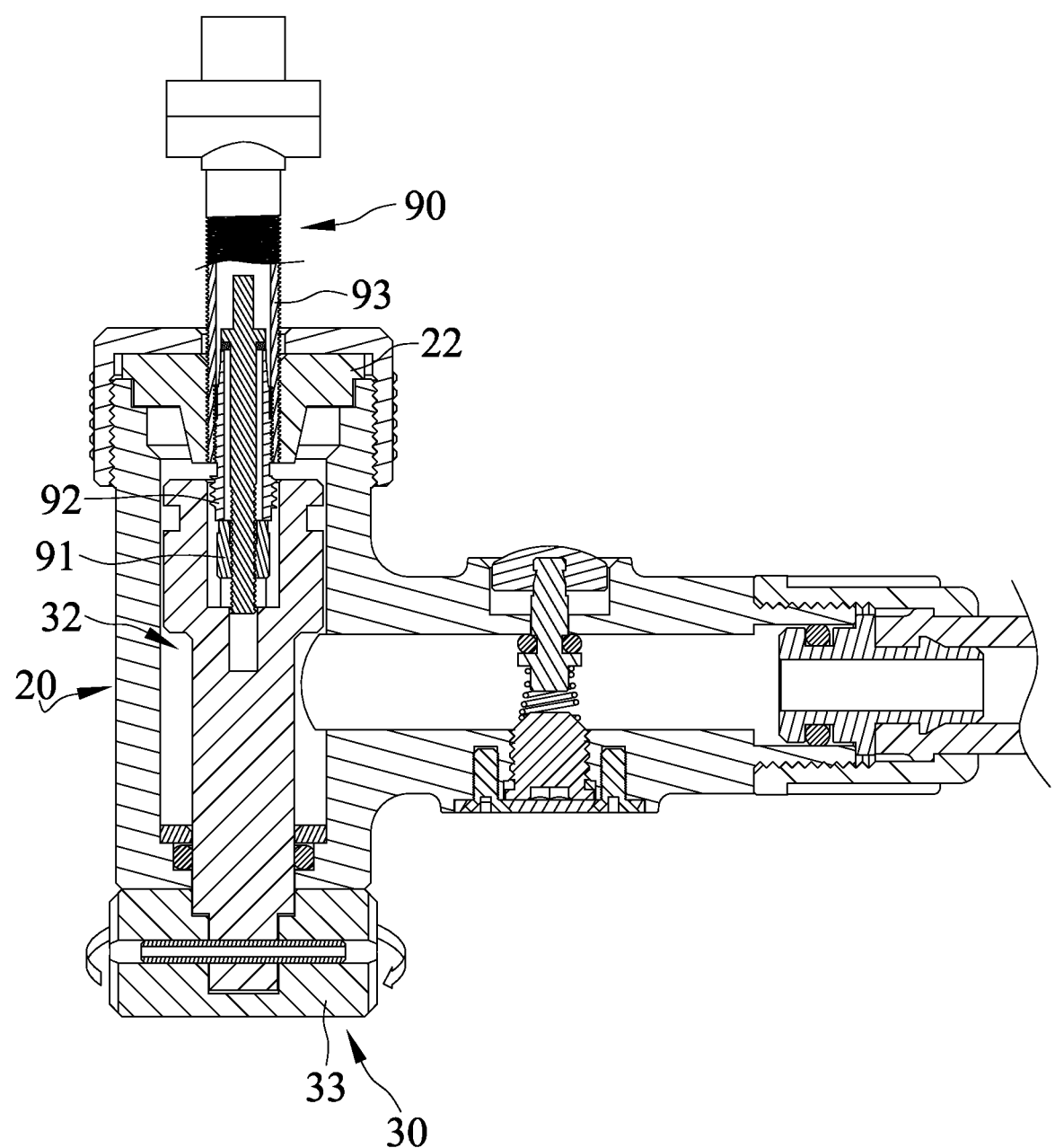
FIG. 5 is a cross sectional view of the Presta valve connector of FIG. 1 and shows the Presta valve connector connected to a Presta valve.
Figure 6:
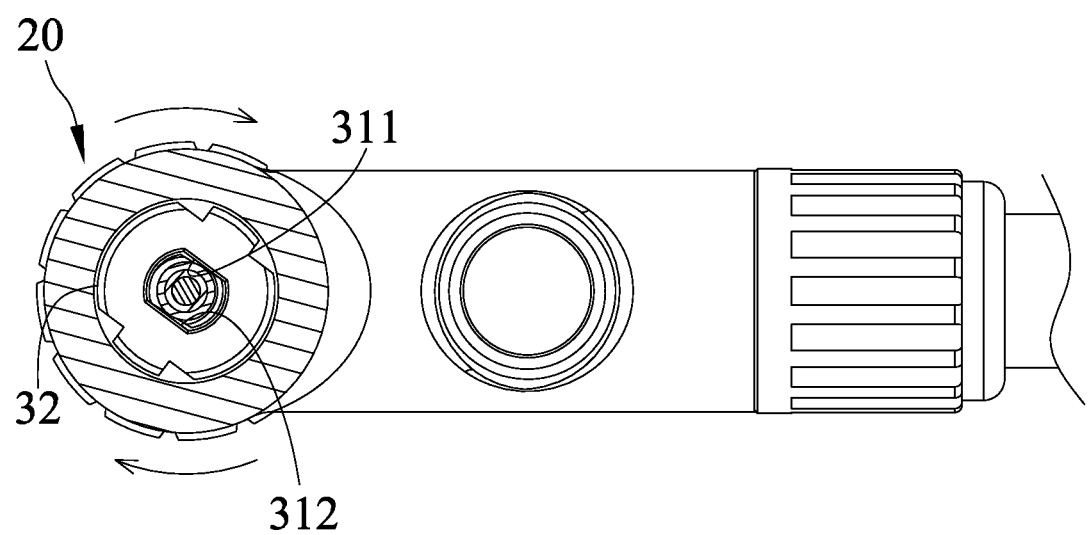
FIG. 6 is a cross sectional view of the Presta valve connector of FIG. 1 and shows the Presta valve connector rotating a core assembly of the Presta valve.
Figure 7:
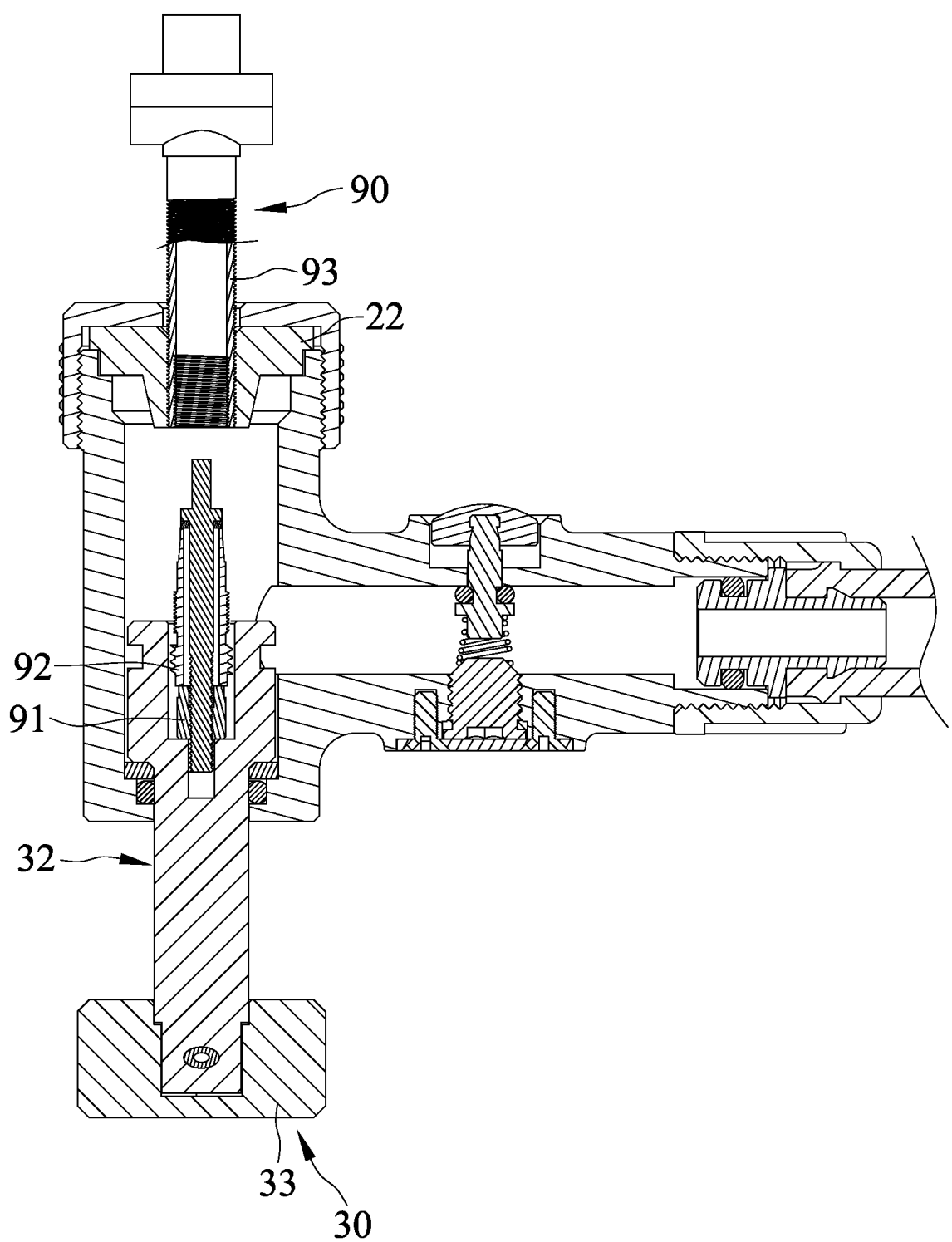
FIG. 7 is a continued cross sectional view of FIG. 5 and shows the valve core of the Presta valve detached from a valve stem of the Presta valve.

With reference to FIGS. 5-7, the Presta valve connector 10 can increase the air intake amount when inflating a Presta valve 90 through the above structure. When the Presta valve connector 10 is in use, it can be directly connected to the Presta valve 90 without first rotating a nut 91 at a top end of the Presta valve 90, and the driving groove 31 is attached with the core assembly 92 of the Presta valve 90. The core assembly 92 can be rotated away from a valve stem 93 of the Presta valve 90, and through the design of the stripping assembly 30 can slide in relative to the housing 20 to cause the core assembly 92 completely disengaged from the valve stem 93. In the valve stem 93 can be inflated very quickly when it is completely unblocked, which can save the time of inflating. It is especially effective when the tire is completely flat such as the newly assembled tire or tire repair is completed.

Although specific embodiments have been illustrated and described, numerous modifications and variations are still possible without departing from the scope of the invention. The scope of the invention is limited by the accompanying claims.

The invention claimed is:

1. A Presta valve connector comprising:
a housing provided with a channel, wherein one end of the channel communicates with the outside of the housing and is provided with an airtight ring having a connection hole; and
a stripping assembly rotatably connected to the housing about a rotation axis and movable in relative to the housing in the rotation axis, wherein the airtight ring and the stripping assembly are respectively disposed at two opposite ends of the channel, wherein the stripping assembly defines a first end and a second end along the rotation axis, wherein the first end of the stripping assembly is disposed in the channel, wherein the second end of the stripping assembly is exposed out of the channel, wherein the first end of the stripping assembly is provided with a driving groove recessed in the rotation axis and faced to the connection hole, and wherein the driving groove is provided with a first driving face formed as a plane parallel to the rotation axis.

2. The Presta valve connector as claimed in claim 1, wherein the driving groove is provided with a second driving face formed as a plane parallel to the first driving face.

3. The Presta valve connector as claimed in claim 2, wherein the stripping assembly includes a driving rod and a switch member, wherein a proximal end of the driving rod is disposed in the channel, and wherein a distal end of the driving rod is exposed out of the channel, wherein the driving groove is disposed at the proximal end of the driving rod, and wherein the switch member is rigidly connected to the distal end of the driving rod and is exposed out of the out of the channel.

4. The Presta valve connector as claimed in claim 3, wherein an inner periphery of the channel is provided with a first section and a second section disposed at one side of the first section opposite to the airtight ring, wherein a diameter of the second section in a radial direction of the channel is less than a diameter of the first section in the radial direction of the channel, wherein the driving rod includes a head portion disposed in the first section and a body portion connected to the head portion, wherein a diameter of the head portion in a radial direction of the rotation axis is greater than the diameter of the second section in the radial direction of the channel, wherein one end of the body portion is connected to the head portion, wherein another end of the body portion opposite to the head portion extends through the second section and is exposed out of the channel, and wherein the switch member is rigidly connected to the body portion.

5. The Presta valve connector as claimed in claim 4, wherein the inner periphery of the channel is provided with a third section disposed between the first and second sections, wherein a diameter of the third section in the radial direction of the channel is less than the diameter of the first section in the radial direction of the channel and is greater than the diameter of the second section in the radial direction of the channel, wherein a seal ring and a stopper are located in the channel, wherein the seal ring is disposed in the third section, wherein the stopper is disposed in the first section and abuts against a side of the seal ring opposite to the second section, and wherein the seal ring and the stopper are mounted around the body portion.

6. The Presta valve connector as claimed in claim 5, wherein the body portion is provided with a first insert hole in the radial direction of the rotation axis, wherein the switch member is provided with a second insert hole in the radial direction of the rotation axis, and wherein the stripping assembly includes a connection member mounted through the first and second insert holes.

7. The Presta valve connector as claimed in claim 6, wherein the housing is provided with an end cap disposed at one end of the channel and abutting against the airtight ring.

8. The Presta valve connector as claimed in claim 6, wherein the housing is provided with an inlet passage communicating between two ends of the channel, wherein a positioning member, a pressure relief valve, and an elastic member are arranged in the inlet passage, wherein the positioning member is disposed at one side of the inlet passage in a radial direction of the inlet passage, wherein one end of the pressure relief valve is disposed at another side of the inlet passage opposite to the positioning member in the radial direction of the inlet passage, wherein another end of the pressure relief valve opposite to the positioning member is exposed out of the inlet passage, wherein one end of the elastic member abuts against the positioning member, and wherein another end of the elastic member abuts against the pressure relief valve.

\* \* \* \* \*